United States Patent Office 2,870,013
Patented Jan. 20, 1959

2,870,013

HARDENING OF GELATIN WITH 2,3 DIHYDROXY DIOXANE

Roy A. Jeffreys, Harrow, England, assignor to Eastman Kodak Company, Rochester, N. Y., a corporation of New Jersey No Drawing. Application November 29, 1956
Serial No. 624,968

3 Claims. (Cl. 96—100)

This invention relates to the hardening of gelatin to enhance its resistance to water by incorporating therein 2:3-dihydroxy-1:4-dioxan.

Gelatin is used to a considerable extent in the photographic industry such as a protective colloid for silver halide or in the form of auxiliary layers, antistatic layers, overcoatings and the like. In the use of gelatin for photographic purposes, it is often subjected to treatment with aqueous baths which may vary in pH or which may have raised temperatures. There has been a great deal of work done relating to the improvement of the resistance of gelatin to water so that swelling or melting of the gelatin does not occur which contacted with aqueous solutions in processing operations or in hot drying operations. The compounds which have principally been regarded as useful for treating gelatin to inhibit swelling or melting thereof under processing conditions may be classified as follows:

(1) Metallic salts such as of aluminum or zirconium.
(2) Aldehydes such as formaldehyde or mucochloric acid.
(3) 1,2 or 1,4 diketones.
(4) Quinones which possibly might be considered as diketones.

In many instances these hardeners have exhibited unwanted photographic effects of one kind or another. For instance, hardeners of the aldehyde type sometimes tend to cause an increase in fogging of the emulsion when employed as a hardener therein. The hardeners may cause loss of speed of an emulsion upon storage. It is desirable that a gelatin hardener will not adversely affect the characteristics of a photographic emulsion in which it is employed.

One object of my invention is to provide a hardener for gelatin which exhibits no detrimental photographic effect. Another object of my invention is to provide gelatin coating compositions from which coatings which are resistant to the effect of water of varying pH or of elevated temperatures may be prepared. A further object of my invention is to provide for the hardening of gelatin by the use of 2:3-dihydroxy-1:4-dioxan. Other objects of my invention will appear herein.

I have found that gelatin when employed as a coating or layer is resistant to the effects of water even at elevated temperatures with a small proportion of 2:3-dihydroxy-1:4-dioxan therein. The dihydroxy dioxan exhibits a hardening effect on the gelatin when present in the gelatin composition to any extent. However, the amount in which it will ordinarily be employed will be found within the range of .2–5% thereof, based on the dry weight of the gelatin.

My invention is conveniently carried out by mixing the gelatin while in the form of an aqueous solution thereof with a small proportion of 2:3-dihydroxy-1:4-dioxan. This compound may be prepared by reacting ethylene glycol with glyoxal in a vacuum over $P_2O_5$ (Journal Chemical Society 1955, 1036). This compound may be conveniently incorporated in the gelatin composition by dissolving in water and adding to the aqueous solution of gelatin in this condition. I have found that by using this material as a hardener for gelatin, there is no adverse fogging effect on photographic emulsions using such gelatin as a carrier, the speed of the emulsion is not effected to any appreciable extent and the melting point of the emulsion coating in boiling water is greatly increased by incorporating this hardening material therein.

Example 1

A series of coatings were made using a fine grain negative emulsion and the properties of the coatings were determined one week later. The results were as follows:

| Hardener Used | Amount of Hardener, g. per l. | Speed | Fog | M. P. (° F.) |
|---|---|---|---|---|
| None | | 3,000 | 0.25 | 85 |
| 2:3-dihydroxy-1:4-dioxan | .26 | 2,400 | 0.25 | 108 |
| Do | .88 | 2,400 | 0.22 | 164 |
| Do | 2.65 | 2,170 | 0.27 | >180 |

Example 2

Plates were coated with gelatin silver halide emulsion; in one case containing no hardener, in another case containing mucochloric acid and in three other cases containing hardener in accordance with my invention. The plates were incubated for three days at 94% RH and 120° F. and for 7 days at 42% RH and 120° F. It was found that the dihydroxy-dioxan had no adverse effect upon the speed or fog of the emulsion and that the coatings were satisfactorily hardened thereby increasing their resistance to the effect of hot water when immersed therein. The following table gives the results:

| Hardener Used | Amount of Hardener in the emulsion, g. per l. | M. P. (° F.) after 3 days' incubation | After 7 days' incubation | | |
|---|---|---|---|---|---|
| | | | Speed | Fog | Melting Point |
| None | | 98 | 21.5 | 0.30 | 90 |
| Mucochloric acid | .15 | 147 | 20.5 | 0.26 | 98 |
| 2:3-dihydroxy-1:4-dioxan | .26 | 207+ | 20.0 | 0.28 | 140 |
| Do | .88 | 207+ | 18.5 | 0.28 | 207+ |
| Do | 2.65 | 207+ | 17.0 | 0.28 | 207+ |

Example 3

In a series of coatings the effect of incorporating dihydroxy-dioxan hardener in different proportions in a negative type emulsion compared with coatings without it was observed. The emulsions were coated out onto the supports. The coatings were tested both just after their application and drying and again after the coatings had been held for one week at 120° F. The results which were obtained were those shown in the following table:

| Weight of Hardener Per 100 Gelatin | Fresh Tests (No Incubation) | | | 120°—One Week | | | Melting Point (° F.) |
|---|---|---|---|---|---|---|---|
| | Speed | Gamma | Fog | Speed | Gamma | Fog | |
| Dihydroxydioxan: | | | | | | | |
| None | 317 | 1.09 | .10 | 286 | 0.84 | .28 | 85 |
| .57 g | 304 | 0.81 | .07 | 264 | 0.56 | .23 | 174 |
| 1.14 g | 309 | 0.84 | .09 | 281 | 0.69 | .23 | 212-2′+ |
| Formaldehyde: | | | | | | | |
| 0.46 g | 300 | 0.69 | .09 | 237 | 0.52 | .57 | 212 |

212-2′+ means that the temperature was held at 212° F. for 2 seconds without melting having taken place.

Dihydroxydioxan is an excellent hardener for photographic emulsion coatings both of black and white emulsion types and color emulsions. Dihydroxydioxan does not react with the couplers of color emulsions as is characteristic of some other gelatin hardeners. Hardeners which have been employed heretofore usually suffer, all or in part, from three disadvantages when employed in photographic emulsion coatings contain color couplers.

a. Either they do not harden the gelatin sufficiently for the coating to withstand color processing;

b. The hardener reacts with at least some of the color formers notably, the magenta couplers of the pyrazolone type and the yellow couplers of the acylacetanilide type to produce undesirable stain, or c. They restrict the bleaching and removal of the developed silver after the photographic coatings have been developed to a color image.

However, none of these undesirable characteristics are found in photographic coatings containing color couplers which have been hardened with dihydroxydioxan. The following examples illustrate the use of this hardener in color photography coatings.

Example 4

There was added to one mole of a red sensitive negative-speed gelatin-silver halide emulsion, 87.6 g. of 6 - {α - {4 - [α - (2,4-di-tert.amylphenoxy)butyramidol phenoxy}acetamido}-2,4-dichloro-3-methyl phenol, a cyan color former suitably dispersed in a lyophobic solvent. There was added to one portion thereof mucochloric acid in an amount of .237% of the gelatin present and to four other portions dihydroxydioxan was added in proportions of .435%, .652%, .87% and 1.305% respectively of the total gelatin present. A layer of each emulsion was coated out onto separate film supports and dried in the normal manner. The coatings were exposed in an Eastman 1B Sensitometer and processed in a color development process. The resulting color developed films demonstrated equal sensitivity for each of the coatings and exhibited no visual shift of color, equally low minimum density and no retention of developed silver. The maximum density of the cyan dye to red light increased slightly with increasing levels of dihydroxydioxan. Samples of the coatings were sealed in metal foil envelopes and incubated for 7 days at 120° F. It was found that there were no significant changes in the sensitometric characteristics thereof.

Example 5

The preceding example was repeated except that the cyan coupler was replaced by a magenta coupler of the pyrazolone type. The coatings were exposed and developed as in the preceding example and essentially the same results were obtained.

Example 6

Film emulsion coatings were prepared in a similar manner to those which were prepared in Example 4 but the cyan coupler was replaced by a yellow coupler of the acyl acetanilide type. The coatings were exposed and developed as in Example 4 and the results obtained were substantially the same as those obtained in Example 4. The melting points of the various films were determined after the films had been held for 24 hours at 100° F. and 50% relative humidity. The melting points of the three coatings in which mucochloric acid hardener was employed were 191° F., 182° F. and 192° F. respectively for the coatings with cyan, magenta and yellow coupler. The melting points of the coatings using dihydroxydioxan were either 212° F. in the case of two of the coatings or in the case of the remaining coatings no melting at all after a two-minute immersion in water at 212° F.

The emulsions hardened in accordance with my invention can be any of the gelatin silver halide emulsions which are ordinarily employed for photographic purposes. These emulsions may be of varying halide content and can be chemically sensitized by any of the accepted procedures. The emulsions can be digested with naturally active gelatin or sulfur compounds can be added such as those described in Sheppard U. S. Patent Nos. 1,574,944 and 1,623,499 or in Sheppard and Brigham U. S. Patent No. 2,410,689.

The emulsions described can if desired be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as antifoggants in higher amounts, as described in Trivelli and Smith U. S. Patents 2,566,245 and 2,566,263.

The emulsions described herein, if desired, can be chemically sensitized with gold salts as described in Waller and Dodd U. S. Patent 2,399,083 or stabilized with gold salts as described in Damschroder U. S. Patent 2,597,856 or Yutzy and Leermakers U. S. Patent 2,597,915. Suitable compounds are potassium chloroaurite, potassium aurithiocyanate, potassium chloroaurate, auric trichloride and 2-aurosulfobenzothiazole methochloride.

The emulsions described can if desired be sensitized with reducing agents such as stannous salts (Carroll U. S. Patent 2,487,850), polyamines such as diethylene triamine (Lowe and Jones U. S. Patent 2,518,698), polyamines such as spermine (Lowe and Allen U. S. Patent 2,521,925), or bis(β-aminoethyl) sulfide and its water-soluble salts (Lowe and Jones U. S. Patent 2,521,926):

The described emulsions can be stabilized with the mercury compounds of Allen, Byers, and Murray U. S. Patent 2,728,663, Carroll and Murray U. S. Patent 2,728,664, or Leubner and Murray U. S. Patent 2,728,665, the tetrazaindenes of Carroll U. S. Patent 2,716,062, or the quaternary benzothiazolium compounds of Brooker and Staud U. S. Patent 2,131,038.

The emulsions used may contain speed-increasing compounds of the quaternary ammonium type of Carroll U. S. Patent 2,271,623, Carroll and Allan U. S. Patent 2,288,226 or Carroll and Spence U. S. Patent 2,334,864, or of the polyethylene glycol type described in Carroll and Beach U. S. Patent 2,708,162.

I claim:

1. An aqueous gelatin composition comprising a solution of gelatin in water containing 2,3-dihydroxydioxan.

2. A gelatin-silver halide photographic emulsion containing a small proportion of 2,3-dihydroxydioxan.

3. A gelatin-silver halide photographic emulsion containing therein a color coupler and a small proportion of 2,3 dihydroxy dioxane.

References Cited in the file of this patent

FOREIGN PATENTS 675,858    Great Britain _____ July 16, 1952

UNITED STATES PATENT OFFICE

Certificate of Correction

Patent No. 2,870,013

January 20, 1959

Roy A. Jeffreys

It is hereby certified that error appears in the printed specification of the above numbered patent requiring correction and that the said Letters Patent should read as corrected below.

Columns 3 and 4, the footnote under the table should read as shown below instead of as in the patent:

$212-2'+$ means that the temperature was held at 212° F. for 2 minutes without melting having taken place.

column 3, line 42, Example 4, for "butyramidol" read —butyramido]—.

Signed and sealed this 16th day of June 1959.

[SEAL]

Attest:
KARL H. AXLINE,
*Attesting Officer.*

ROBERT C. WATSON,
*Commissioner of Patents.*